United States Patent
Hagano

(10) Patent No.: US 8,191,588 B2
(45) Date of Patent: Jun. 5, 2012

(54) FUEL TANK OPENING-CLOSING DEVICE

(75) Inventor: Hiroyuki Hagano, Aichi-ken (JP)

(73) Assignee: Toyoda Gosei Co., Ltd., Aichi-pref (JP)

( * ) Notice: Subject to any disclaimer, the term of this patent is extended or adjusted under 35 U.S.C. 154(b) by 398 days.

(21) Appl. No.: 12/591,417

(22) Filed: Nov. 19, 2009

(65) Prior Publication Data

US 2010/0133274 A1  Jun. 3, 2010

(30) Foreign Application Priority Data

Nov. 28, 2008 (JP) .................................. 2008-303890

(51) Int. Cl.
*B65B 1/04* (2006.01)

(52) U.S. Cl. ........ 141/350; 141/348; 141/349; 220/86.2

(58) Field of Classification Search .......... 141/348–350; 220/86.2

See application file for complete search history.

(56) References Cited

U.S. PATENT DOCUMENTS

| | | | |
|---|---|---|---|
| 5,465,861 A * | 11/1995 | Kunz et al. .................... | 220/260 |
| 6,968,874 B1 * | 11/2005 | Gabbey et al. ................ | 141/349 |
| 6,994,130 B1 * | 2/2006 | Gabbey et al. ................ | 141/371 |
| 7,182,111 B2 | 2/2007 | McClung et al. | |
| 7,318,462 B2 * | 1/2008 | Ganachaud .................... | 141/350 |
| 7,762,291 B2 * | 7/2010 | Martin et al. ................. | 141/350 |

FOREIGN PATENT DOCUMENTS

| | | |
|---|---|---|
| WO | WO 2005/077698 A1 | 8/2005 |
| WO | WO 2008/013325 A1 | 1/2008 |

\* cited by examiner

*Primary Examiner* — Timothy L Maust
(74) *Attorney, Agent, or Firm* — Posz Law Group, PLC

(57) ABSTRACT

A fuel tank opening-closing device includes a shutter mechanism situated inside a tank neck defining member and adapted to open a shutter body in response to insertion of a fuel nozzle. The shutter mechanism includes a push mechanism having a push member situated in an insertion passage; an interconnection mechanism having springs adapted to accumulate force of displacement of the push member as mechanical energy; and a nozzle sensing mechanism. The nozzle sensing mechanism has introduction pressure members adapted to receive displacement force of the fuel nozzle in the insertion direction, and lock portions that allow the shutter to move to the opening position.

16 Claims, 9 Drawing Sheets

FUEL TANK OPENING-CLOSING DEVICE

This application claims the benefit of and priority from Japanese Application No. 2008-303890 filed Nov. 28, 2008, the content of which is incorporated herein by reference.

BACKGROUND OF THE INVENTION

1. Field of the Invention

The present invention relates to a fuel tank opening-closing device, whereby insertion force of the fuel nozzle is utilized to open a shutter and permit filling of the fuel tank.

2. Description of the Related Art

One known technology of this kind, disclosed in WO 2005-077698A1, provides a shutter moveable in the diametrical direction of the fuel passage; an actuation ring adapted to be pushed by the fuel nozzle; and an interconnection mechanism for interlocked operation with the actuation ring to open the shutter. According to this design, the actuation ring is radially expanded by pushing the actuation ring with the tip of the fuel nozzle, and the displacement produced by this radial expansion is amplified by the interconnection mechanism, thereby producing opening movement of the shutter and making it possible to insert the fuel nozzle.

However, with the conventional system, the amount of displacement produced by radial expansion of the actuation ring does not exceed a few millimeters, and to open the shutter using this amount of displacement requires a high amplification ratio on the part of the interconnection mechanism. A resultant problem was that opening and closing movement of the shutter could be impeded due to frictional force occurring with even slight freezing up of the interconnection mechanism and/or shutter. An additional problem was that, in a preferred design whereby the pushed part of the actuation ring can be reliably pushed by the fuel nozzle and whereby the insertion force of the fuel nozzle can be utilized to actuate opening of the shutter, the pushed part of the actuation ring will be situated in an insertion passage only slightly larger than the circumference of the fuel nozzle, and the insertion passage will have a length such that the pushed part can be pushed along for a considerable distance; however, a long narrow insertion passage of such design results in poor ease of operation during fuel nozzle insertion.

SUMMARY

An advantage of some aspects of the invention is to provide a fuel tank opening-closing device adapted to efficiently utilize insertion force of the fuel nozzle to open the shutter wide in a smooth manner, as well as affording compact size and enhanced ease of fueling operations.

According to an aspect of the invention, the invention provides a fuel tank opening-closing device adapted to open and close a passage for supplying fuel to a fuel tank. The device comprises: a tank neck defining member defining the passage that includes an insertion passage for insertion of a fuel nozzle and an insertion aperture to connect the insertion passage with the fuel tank; and a shutter mechanism situated inside the tank neck defining member, and having a shutter adapted to open and close the insertion aperture through displacement in a direction substantially perpendicular to an insertion direction in which the fuel nozzle is inserted. The shutter mechanism includes: a push mechanism situated in the insertion passage and having a push member adapted to undergo displacement upon receiving insertion force of the fuel nozzle; an interconnection mechanism adapted to accumulate force of the displacement of the push member as mechanical energy, and to open the shutter using the accumulated mechanical energy; and a nozzle sensing mechanism situated between the push member and the shutter, and having an introduction pressure member adapted to receive the insertion force by the fuel nozzle; and a lock portion formed to be switchable between a locked position locking the shutter in a closing position and an unlocked position allowing the shutter to move to an opening position. The shutter mechanism is configured to open the shutter by the mechanical energy accumulated in the interconnection mechanism, when the lock portion of the nozzle sensing mechanism shifts from the locked position to the unlocked position.

With the fuel tank opening-closing device according to the present invention, when the fuel nozzle is inserted into the insertion passage of the tank neck defining member, the tip of the fuel nozzle will push against the push member of the push mechanism. The displacement force of the pushed portion will be accumulated as mechanical energy in the interconnection mechanism. Then, when the fuel nozzle reaches the introduction pressure member of the nozzle sensing mechanism and begins to push against the introduction pressure member, the lock part will switch the shutter from the closing position to the unlocked position. The mechanical energy which is accumulated in the interconnection mechanism will thereby actuate opening of the shutter. The shutter uncloses the insertion aperture to permit fueling therethrough from the fuel nozzle.

The interconnection mechanism is adapted to accumulate, in the form of mechanical energy, the displacement force of the push member of the push mechanism when pushed by the tip of the fuel nozzle; and when the tip of the fuel nozzle has pushed against the introduction pressure member of the nozzle sensing mechanism, to then utilize this accumulated mechanical energy to actuate opening of the shutter. Accordingly, the push mechanism is not limited to the location of the nozzle sensing mechanism, and can be situated a considerable distance toward the insertion side beyond the nozzle sensing mechanism so that a large amount of mechanical energy that has been accumulated utilizing the considerable displacement of the push member will be available for opening the shutter. Thus, opening and closing movement of the shutter can take place more reliably, even if increased frictional force is encountered due to freezing up of the shutter or the like.

The push mechanism and the nozzle sensing mechanism are constituted as separate mechanisms situated apart from one another within the insertion passage; specifically, the push mechanism is situated at the wide-mouthed access inlet of the insertion passage at the insertion aperture end thereof, while the nozzle sensing mechanism is situated close to the shutter. Consequently, the fuel nozzle can be inserted into an insertion passage having this sort of large access inlet, thus affording improved ease of fueling operations.

Further, even when the push member of the push mechanism is pushed against by the fuel nozzle, the shutter will not open until the introduction pressure member of the nozzle sensing mechanism are pushed by the fuel nozzle, and therefore even if fuel is inadvertently discharged from the fuel nozzle, the fuel will be blocked and will not be delivered to the fuel tank.

The shutter mechanism is designed so that once the push member of the push mechanism has been pushed against by the fuel nozzle, the shutter will open when the introduction pressure member of the nozzle sensing mechanism are pushed, thereby affording a simple design that requires no driving mechanism, such as switches or motors, to accomplish the opening or closing movement.

In a design according to a second mode, the interconnection mechanism includes an interconnection member mechanically coupled with the push member and adapted to undergo displacement in interlocked fashion therewith; and an accumulation member adapted to accumulate mechanical energy arising from displacement of the coupling member.

In another design according to a third mode, the interconnection member is an actuation member body slidably installed over the shutter; and the storage means is an elastic member disposed suspended between the actuation member body and the shutter. With this design, the interconnection mechanism can be realized through a simple design. Here, the elastic member can be a coil spring; or a spring made of resin could be employed.

In yet another design according to a fourth mode, the nozzle sensing mechanism includes a nozzle sensing member that is supported on the neck defining member and that has a U-shaped profile situated above the interconnection member; the introduction pressure member are disposed in the inner peripheral part of the nozzle sensing member; and the lock portions are disposed at the end of the nozzle sensing member. The elastic member can be constituted by a spring of resin integrally formed with the nozzle sensing member.

Yet another design according to a fifth mode includes a filler inlet defining member having a filler inlet situated in opposition to the insertion aperture; and a flap valve mechanism situated to the fuel tank side of the shutter and adapted to be pushed against by the fuel nozzle and open access to the insertion aperture. With this design, if a fuel nozzle of incorrect type is inadvertently inserted into the insertion passage, it will be blocked by the shutter mechanism and prevented from coming into direct contact with the flap valve mechanism, thus avoiding damage to the flap valve mechanism, as well as eliminating the need for the flap valve mechanism per se to be made stronger in consideration of the possibility of such an event.

These and other objects, features, aspects, and advantages of the present invention will become more apparent from the following detailed description of the preferred embodiments with the accompanying drawings.

BRIEF DESCRIPTION OF THE DRAWINGS

DESCRIPTION OF THE PREFERRED EMBODIMENTS (1) Overall Design of Fuel Tank Closure System FIG. 1 is a perspective view depicting the rear section of a vehicle that is equipped with a diesel engine according to an embodiment of the invention, and showing the fuel cover open. A recloseable fuel cover FL providing access for filling with fuel (light diesel oil) is supported on the rear section of the car. The recloseable fuel cover FL includes a cover body FLa that conforms to the contours of an exterior panel of the vehicle body and is supported on the exterior panel of the vehicle body via a hinge FLb. The space accessible with the open fuel cover FL open constitutes a fueling chamber FR, and a fuel tank opening-closing device 10 supported on a base panel BR is situated inside this fueling chamber FR. The fuel tank opening-closing device 10 is a mechanism adapted to allow fuel to be supplied to the fuel tank without having to use a fuel cap, and is of a design such that once the fuel cover FL has been opened, by opening access to the fuel passage utilizing outside force applied from the fuel nozzle, fuel can be supplied to the fuel tank. The specific design of this fuel tank opening-closing device will be described below.

(2) Design and Operation of Parts

Figure 2:
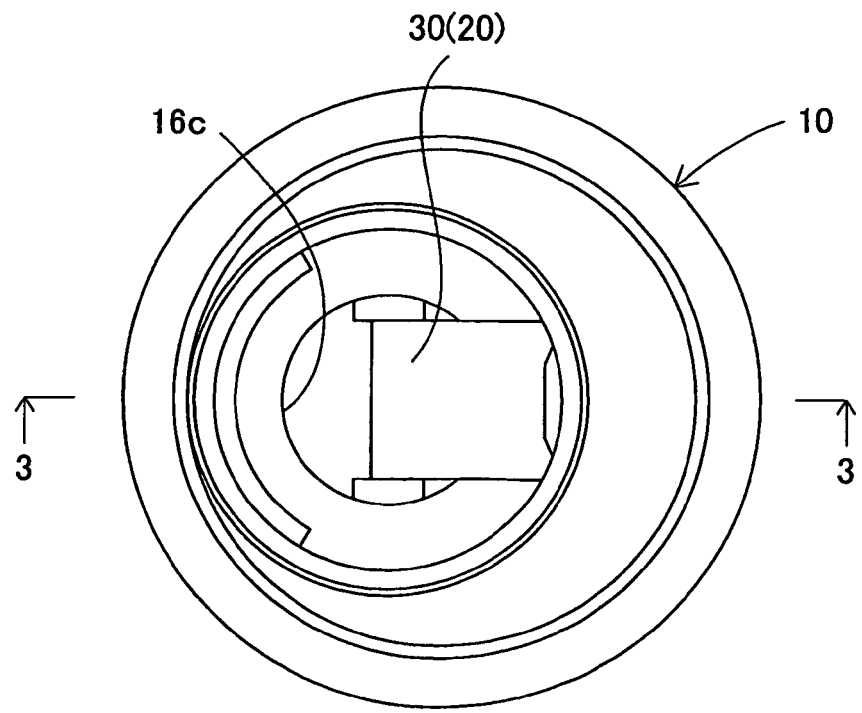
FIG. 2 is a plan view depicting the neck of the fuel tank opening-closing device.
Figure 3:
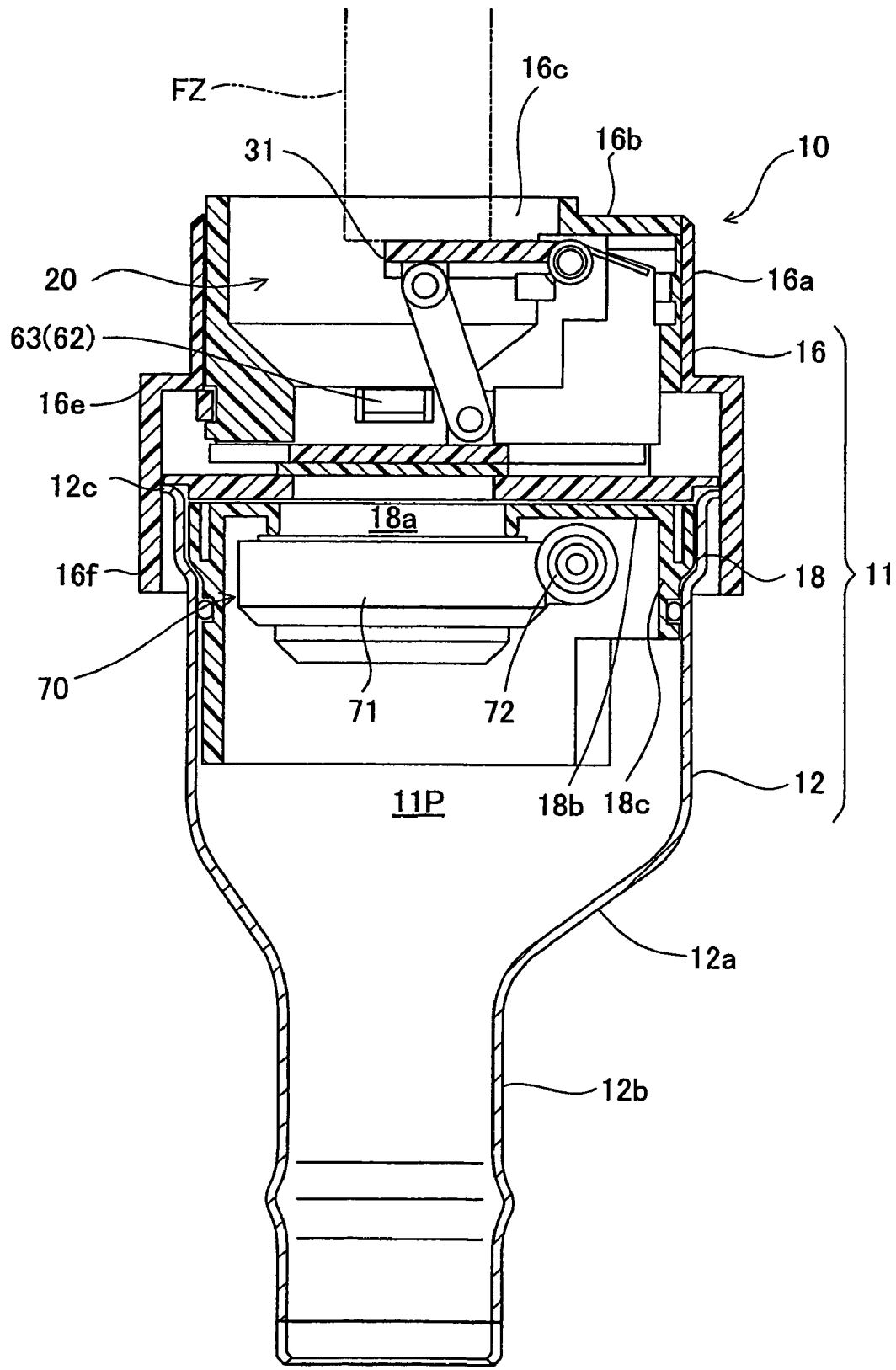
FIG. 3 is a sectional view taken along line 3-3 of FIG. 2.

FIG. 2 is a plan view depicting the neck of the fuel tank opening-closing device 10; and FIG. 3 is a sectional view taken along line 3-3 of FIG. 2. In FIG. 3, the fuel tank opening-closing device 10 includes a tank neck defining member 11 having a fuel passage 11P that connects with the fuel tank (not shown); a shutter mechanism 20 adapted to open or close access to the fuel passage 11P; and a flap valve mechanism 70.

(2)-1 Tank Neck Defining Member 11

The tank neck defining member 11 is a pipe that defines the fuel passage 11P, and includes a connector pipe 12 connecting to the fuel tank, a neck defining member 16 secured to the top part of the connector pipe 12, and a filler inlet defining member 18 mounted to the top part of the connector pipe 12.

The connector pipe 12 includes a reduced diameter section 12a of progressively reduced diameter toward the fuel tank side, and a straight pipe section 12b connecting with the reduced diameter section 12a, these sections being integrally formed. The neck defining member 16 is installed at the top of the connector pipe 12 and includes a sidewall 16a of round tube shape, and an upper face 16b that is integrally formed with the sidewall 16a. The section below the sidewall 16a defines a lower round tube section 16f that extends from an expanded diameter section 16e of somewhat expanded diameter. An access inlet 16c is formed in the center part of the upper face 16b.

The filler inlet defining member 18 is a member adapted to secure to the top of the connector pipe 12 and to support part of the flap valve mechanism 70; it includes a circular plate portion 18b having a filler inlet 18a which defines part of the fuel passage 11P; and a mating portion 18c of round tubular contours projecting from the outside circumference of the circular plate portion 18b and adapted to mate with the connector pipe 12.

(2)-2 Shutter Mechanism 20

Figure 4:
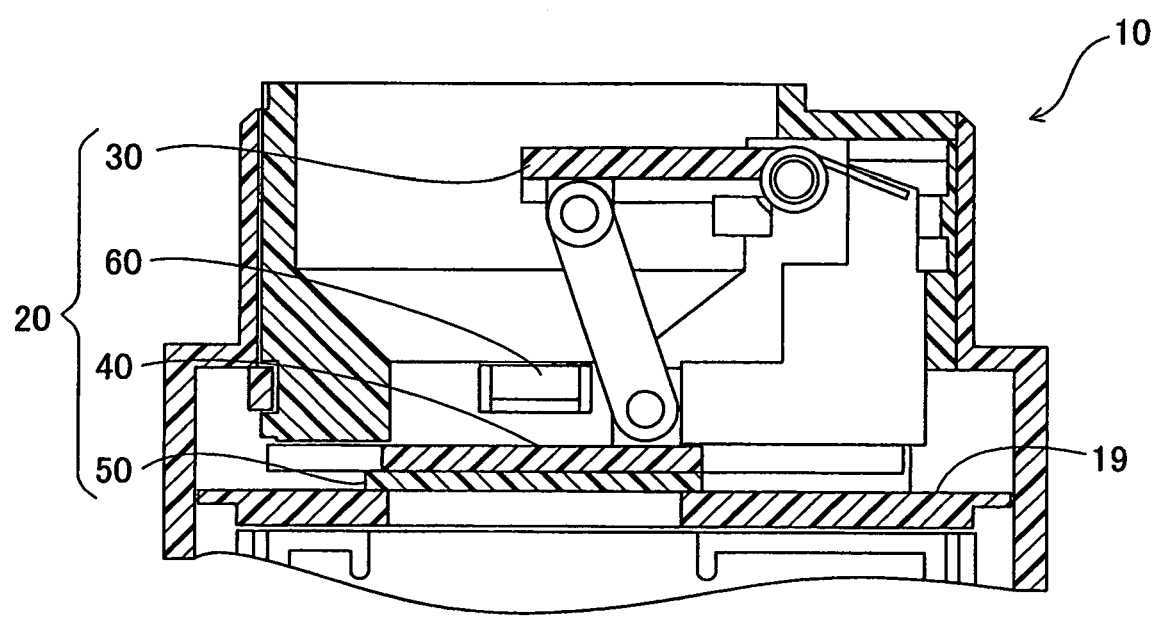
FIG. 4 is a sectional view depicting the shutter mechanism of FIG. 3.

FIG. 4 is a sectional view depicting the shutter mechanism 20 of FIG. 3. The shutter mechanism 20 is a mechanism designed to produce opening movement upon being pushed against by the tip of a fuel nozzle FZ, and has as its principal components a support member 19, a push mechanism 30, an interconnection mechanism 40, a shutter 50, and a nozzle sensing mechanism 60.

Figure 5:
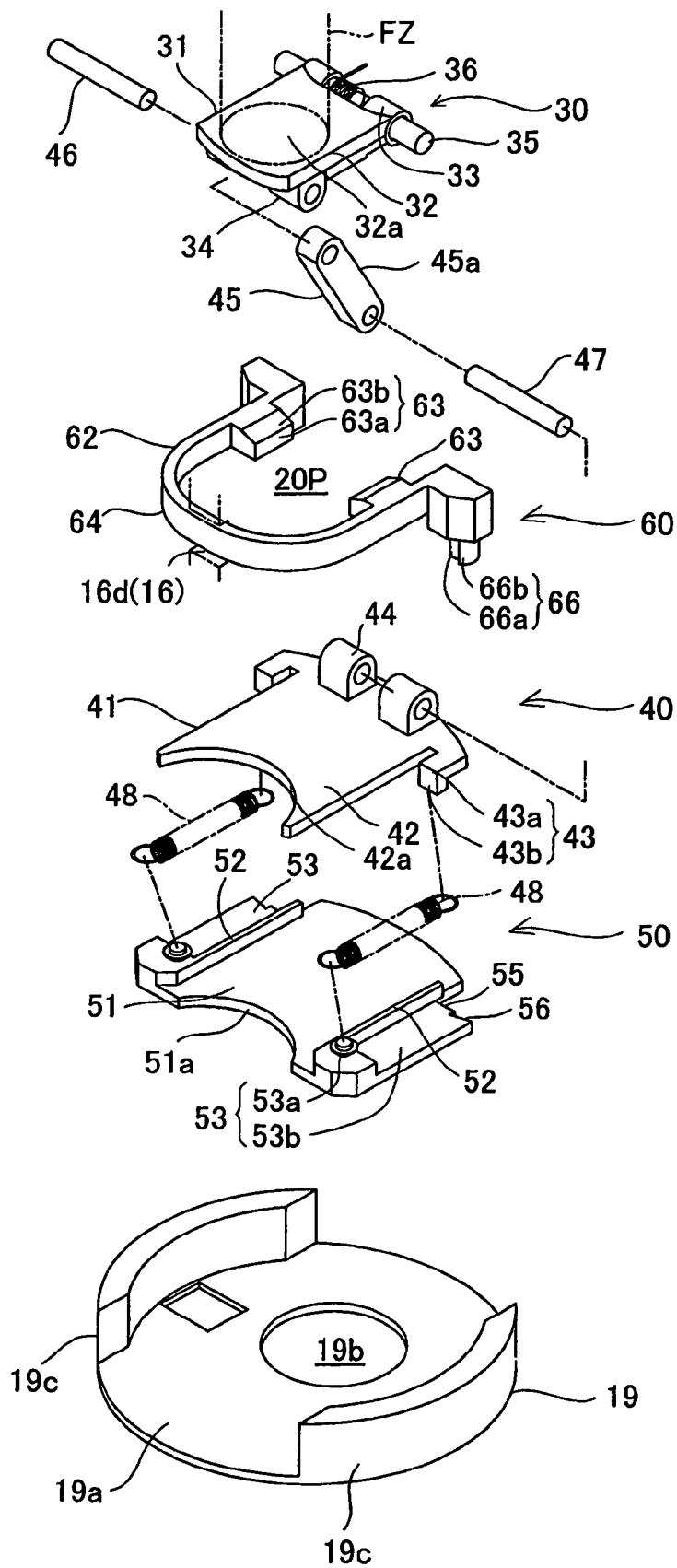
FIG. 5 is an exploded perspective view of the shutter mechanism.

FIG. 5 is an exploded perspective view of the shutter mechanism 20. The support member 19, which is installed on the filler inlet defining member 18 (FIG. 3), includes a supporting base plate 19a of circular disk shape; an insertion aperture 19b formed passing through the supporting base plate 19a; and arc-shaped guide portions 19c, 19c of prescribed width formed at the outer circumference of the supporting base plate 19a. The insertion aperture 19b is an aperture of substantially the same inside diameter as the filler inlet 18a (FIG. 3), and is intended to accommodate insertion of the fuel nozzle.

The push mechanism 30, a mechanism designed to open the shutter 50 through the agency of the interconnection mechanism 40 in response to force arising when the fuel nozzle FZ has been inserted, includes a push member 31. The push member 31, which includes a push member body 32 of plate shape, and a rotational support part 33 that is integrally formed at the end of the push member body 32, is axially supported in the neck defining member 16 by a shaft body 35 (FIG. 3). The push member body 32 has on its upper face a curving face 32a that is curved in order to provide smooth contact with the fuel nozzle FZ. The shaft body 35 has installed thereon a torsion spring 36 which urges the push member body 32 in the closed direction. Owing to the design of this push mechanism 30, when the push member body 32 is pushed by the fuel nozzle FZ, the push member body 32 will rotate about the shaft body 35 in opposition to the spring force of the spring 36.

The interconnection mechanism 40, which is a mechanism that functions to accumulate the displacement force of the push mechanism 30 as mechanical energy and to open the shutter 50 by means of this accumulated mechanical energy, includes an interconnection member 41; a link member 45 of rod shape for mechanically coupling the interconnection member 41 with the push mechanism 30; and springs 48 (accumulation members) for accumulating mechanical energy. The interconnection member 41 includes an actuation member body 42 of flat plate shape. A curving portion 42a is formed at the front edge of the actuation member body 42. Extended portions 43 are formed at either side of the actuation member body 42. On each extended portion 43 there are formed a spring supporting edge 43a adapted to support one end of the spring 48, and a pushing edge 43b adapted to push the shutter 50. A link supporting portion 44 projects up from the top end of the actuation member body 42. The link member 45 includes a link body 45a which is a rod-shaped member; its upper edge is rotatably coupled via a pin 46 to a link supporting portion 34 that projects from the bottom of the push member body 32, while its lower edge is rotatably coupled via a pin 47 to the link supporting portion 44.

The shutter 50, which is a mechanism adapted to slide over the support member 19 in interlocked operation with the push mechanism 30 and the interconnection mechanism 40 in order to open or close access to the insertion aperture 19b, includes a shutter body 51 of substantially rectangular plate shape. Guide ribs 52 for guiding both side edges of the interconnection member 41 are formed at both sides of the shutter body 51. Extended portions 53, 53 are also formed at both sides of the shutter body 51, at some distance from the guide ribs 52, 52. On each extended portion 53 there are formed a spring supporting portion 53a adapted to support one end of the spring 48, and a spring housing recess 53b. The springs 48 function as an accumulation member for accumulating displacement force of the interconnection member 41 in the form of mechanical energy prior to displacement of the shutter 50. At the edge of the extended portion 53 there are formed a push edge 55 adapted to be pushed by the pushing edge 43b of the interconnection mechanism 40, and a locking portion 56 adapted to be pushed by a portion of the nozzle sensing mechanism 60, discussed later. The spring 36 provided for imparting spring force to the push member 31 applies rotational force which acts to return the push member 31 to its initial position once the push member 31 has undergone displacement toward the open direction; it also functions as an accumulation member for accumulating mechanical energy that displaces the shutter 50 toward the closed direction.

Figure 6A:
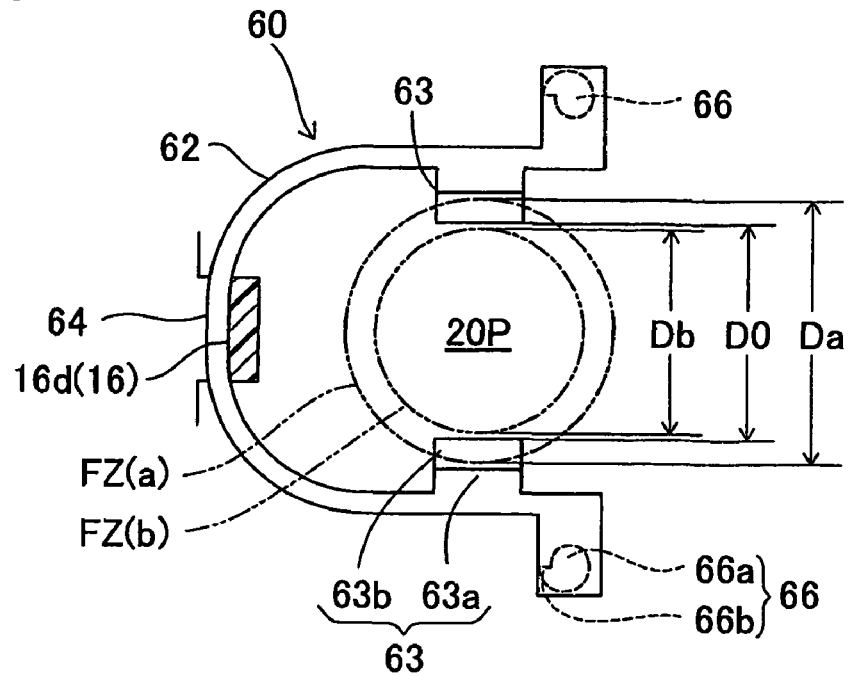
FIGS. 6A and 6B show a nozzle sensing mechanism.
Figure 6B:
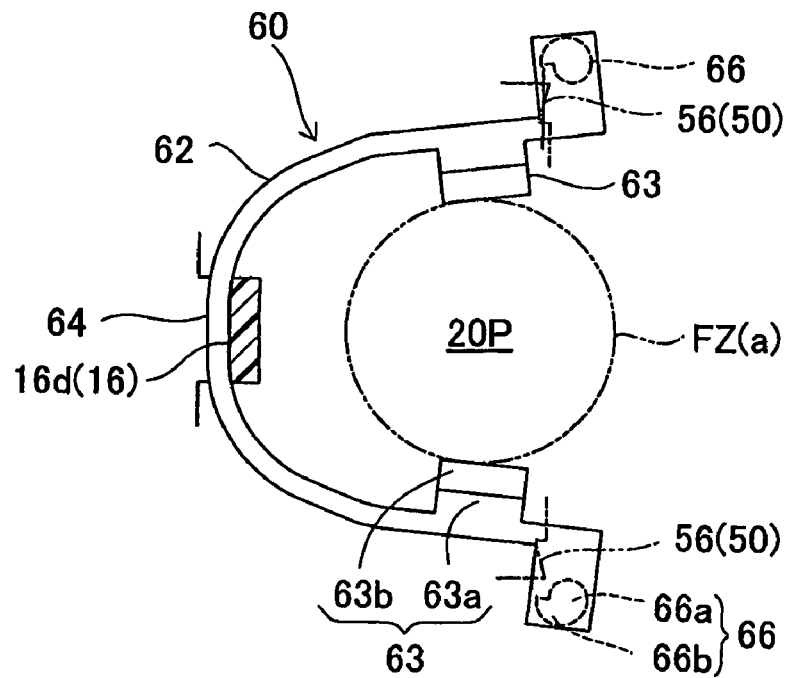

The nozzle sensing mechanism 60 is a mechanism designed to be pushed against by the tip of a fuel nozzle FZ of prescribed outside diameter, thereby releasing the interconnection mechanism 40 from the locked position; it includes a nozzle sensing member 62 that is installed in a mating portion 16d of the neck defining member 16 and that is also supported on the interconnection member 41. The nozzle sensing member 62 includes introduction pressure members 63, 63 situated facing into the insertion passage 20P at both sides thereof, a connecting arm 64 that connects the introduction pressure members 63, 63; and lock portions 66, 66 that project from the bottom at the ends of the connecting arm 64; these components are integrally formed. The connecting arm 64 is supported so as to lie across the top face of the interconnection member 41. Each introduction pressure member 63 has a push body 63a, and a sloping push face 63b that faces toward insertion passage 20P and slopes downwardly from the push body 63a. The sloping push face 63b is situated such that, if the outside diameter of the tip of the fuel nozzle FZ is equal to or greater than a prescribed diameter, the tip of the fuel nozzle FZ will push against the face. FIG. 6 is an illustration depicting the nozzle sensing mechanism 60. Specifically, where D0 represents the inside diameter of the insertion passage 20P defined by the opposed inside edges of the introduction pressure members 63, Da represents the outside diameter of the tip of a diesel fuel nozzle FZ(a), and Db represents the outside diameter of the tip of a gasoline fuel nozzle FZ(b), dimensions will be established such that Db<D0<Da. For example, the outside diameter Db may be set to 20 mm, the inside diameter D0 to 22 mm, and the outside diameter Da to 25 mm. The connecting arm 64 is formed with a semicircular ring shape, and functions as a spring by virtue of connecting the introduction pressure members 63, 63. As shown in FIGS. 5 and 6, the lock portions 66, which are defined by zones that engage and disengage from the locking portions 56 at the edges of the shutter 50, each include a lock portion body 66a, and a lock claw 66b that projects toward the corresponding locking portion 56 from the outside peripheral part of the lock portion body 66a. The nozzle sensing member 62 is rotatably supported via the connecting arm about the mating portion 16d of the neck defining member 16; and through rotation thereof centered on the mating portion 16d, the lock portions 66 are switched between the locked position and the unlocked position with respect to the locking portions 56. By virtue of this design of the nozzle sensing mechanism 60, when the fuel nozzle FZ(a) is inserted into the insertion passage 20P as depicted in FIG. 6(B), it will push against the sloping push faces 63b of the introduction pressure members 63, causing the lock portions 66 to disengage from the locking portions 56 of the shutter 50 so that opening movement of the shutter 50 is possible. There is certain amount of latitude in dimensional range as regards the inside diameter D0 of the insertion passage 20P, with the proviso that even if this diameter is smaller than the outside diameter Db of the gasoline fuel nozzle FZ(b), the diameter will be such that, if the outer perimeter of the tip of the fuel nozzle FZ(b) should push against the sloping push faces 63b, the lock portions 66 will not disengage from the locking portions 56 of the shutter 50 and fueling will not be possible.

(2)-3 Flap Valve Mechanism 70

The flap valve mechanism 70 in FIG. 3 includes an opening/closing member 71, a spring 72, and a gasket (not shown). The opening/closing member 71 is a member that is axially supported by the mating portion 18c of the filler inlet defining member 18, and functions to open or close access to the filler inlet 18a. The spring 72 is a tension spring of coil shape, one end of which is supported by the filler inlet defining member 18 and the other end of which is supported on the opening/closing member 71, and functioning to urge the opening/closing member 71 toward the closed direction. The gasket is made of rubber material and is positioned inside the opening/closing member 71 to provide a sealed closure between the opening/closing member 71 and the rim of the opening of the filler inlet 18a. Also housed in the opening/closing member 71 of the flap valve mechanism 70 is a pressure regulator valve (not illustrated) adapted to regulate pressure of the fuel tank.

Figure 1:
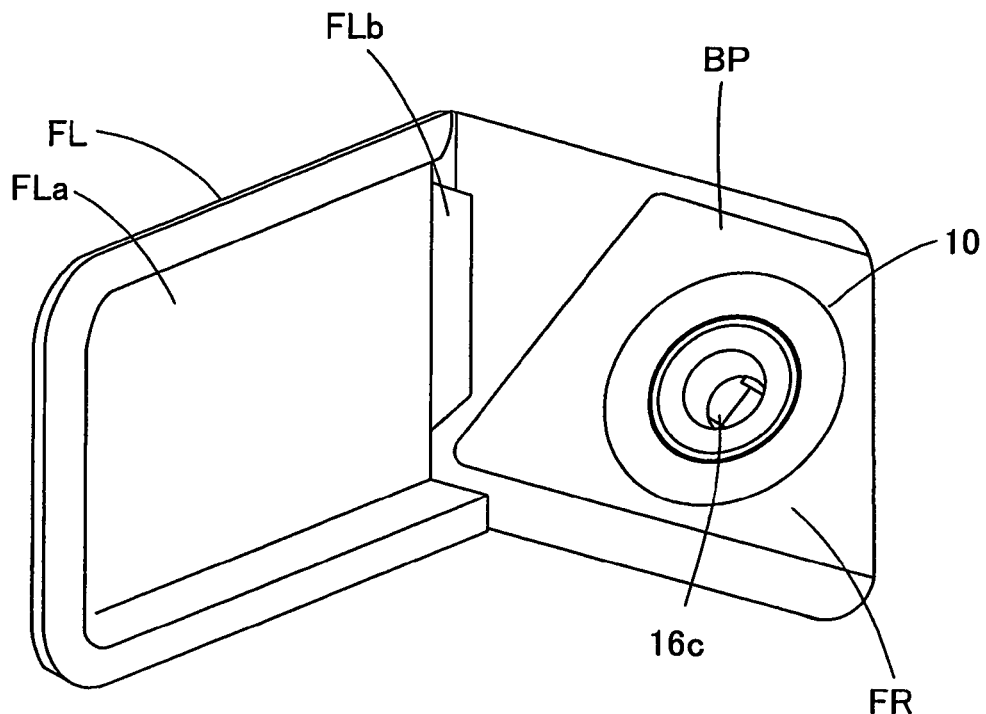
FIG. 1 is a perspective view depicting the rear section of a vehicle equipped with the fuel tank opening-closing device according to an embodiment of the invention, showing the fuel cover open.
Figure 7:
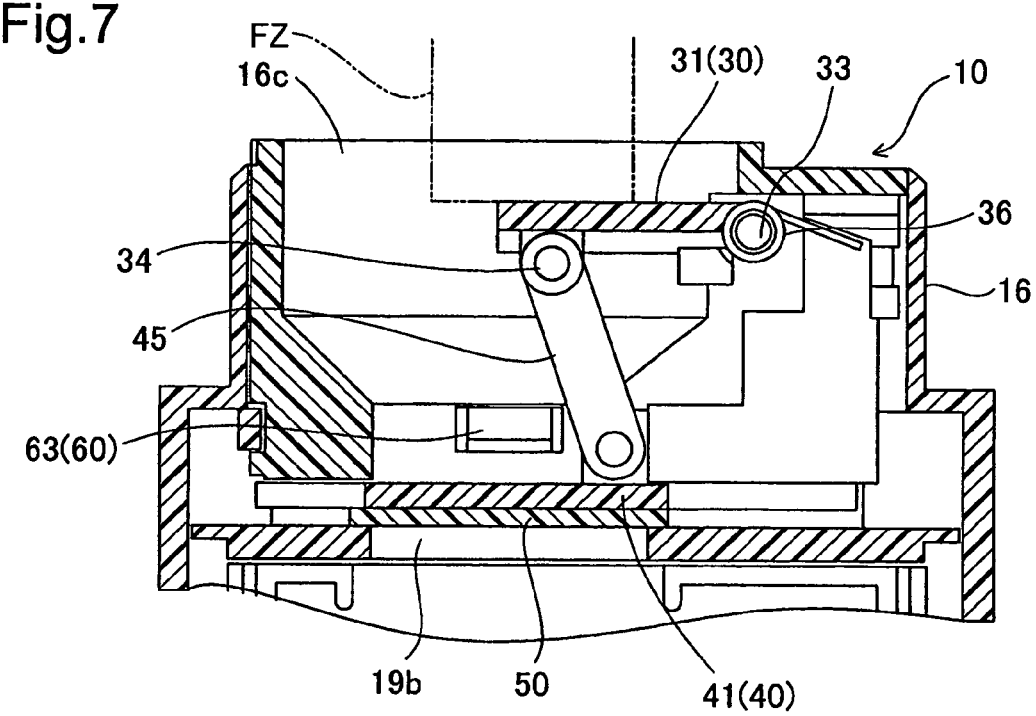
FIG. 7 shows the operation of the fuel tank opening-closing device.
Figure 8:
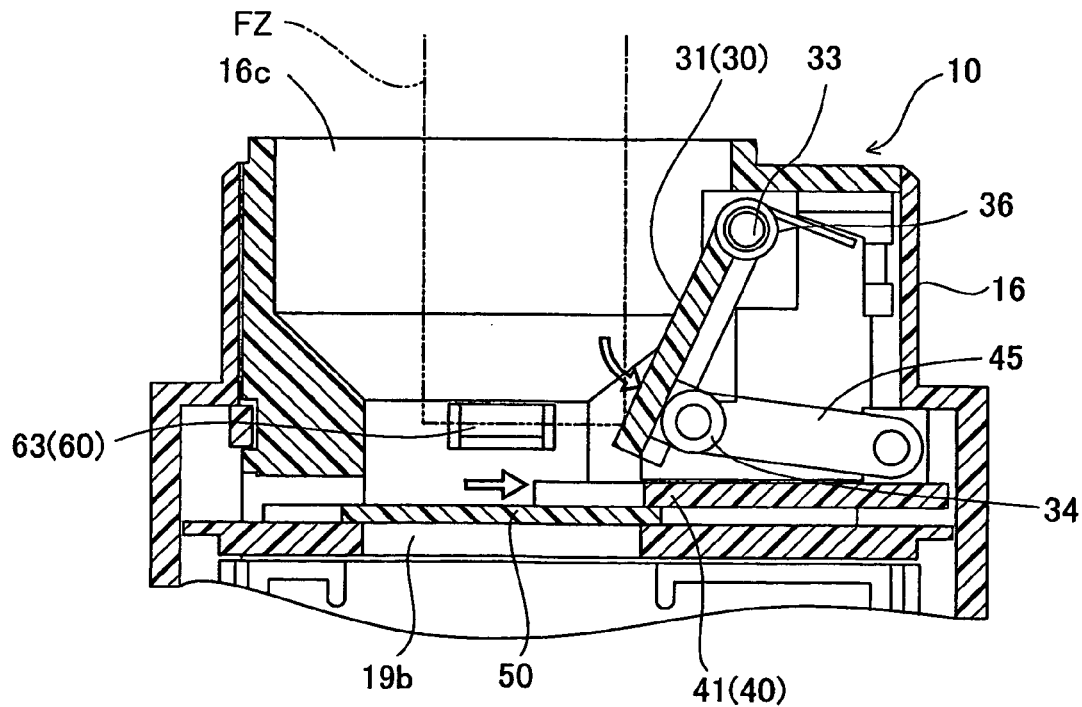
FIG. 8 shows the operation subsequent to FIG. 7.
Figure 9:
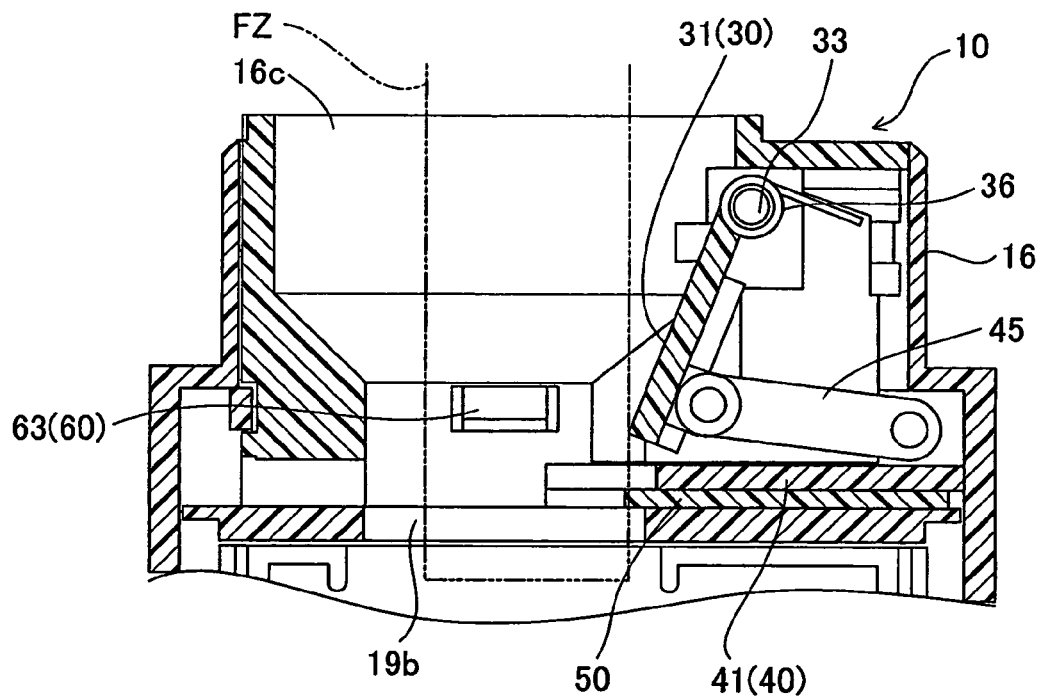
FIG. 9 shows the operation subsequent to FIG. 8.

(3) Opening and Closing Movement of Fuel Tank Closure System (3)-1 Opening Movement As shown in FIG. 1, the fuel cover FL is opened to expose the fuel tank opening-closing device 10 located inside the fueling chamber FR. As depicted in FIG. 7, the fuel nozzle FZ is then inserted through the access inlet 16c of the neck defining member 16, and when the tip of the fuel nozzle FZ pushes against the push member 31 of the push mechanism 30, the push member 31 will rotate about the rotational support part 33 as depicted in FIG. 8. Spring force arising at this time will be accumulated through torsion of the spring 36. As the push member 31 rotates, the link member 45 which is axially supported by the link supporting portion 34 will rotate, and the interconnection member 41 of the interconnection mechanism 40 will undergo displacement in the horizontal direction. Through extension of the springs 48 of the interconnection mechanism 40 (see FIG. 5) produced by displacement of the interconnection member 41, the force of displacement of the interconnection member 41 will be accumulated as mechanical energy. When the fuel nozzle FZ then reaches the introduction pressure members 63 of the nozzle sensing mechanism 60 and pushes against the introduction pressure members 63, the lock portions 66 (FIG. 6) will switch to the unlocked position from the closing position of the shutter 50. Consequently, opening movement of the shutter 50 will take place as depicted in FIG. 9, using the mechanical energy that has been accumulated by the springs 48 (accumulation members). The shutter 50 will open up access to the insertion aperture 19b so that fueling can be carried out from the fuel nozzle.

Figure 10:
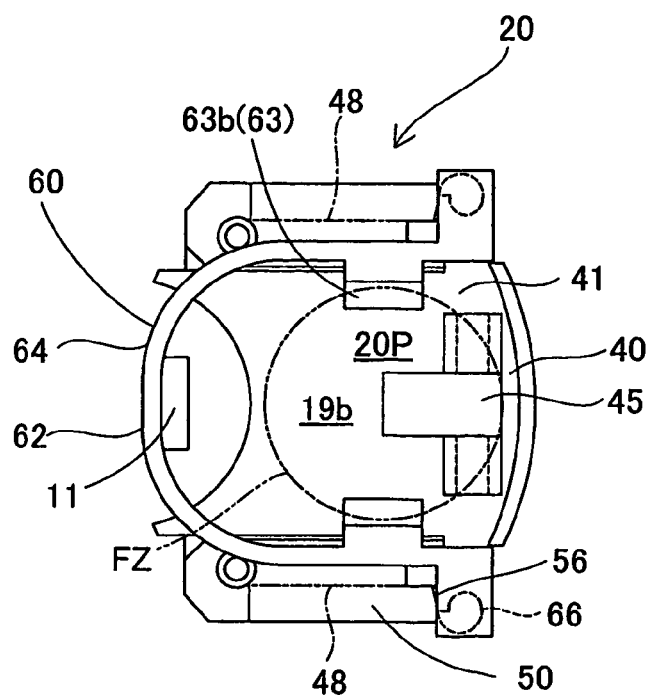
FIG. 10 shows the operation of the shutter mechanism.
Figure 11:
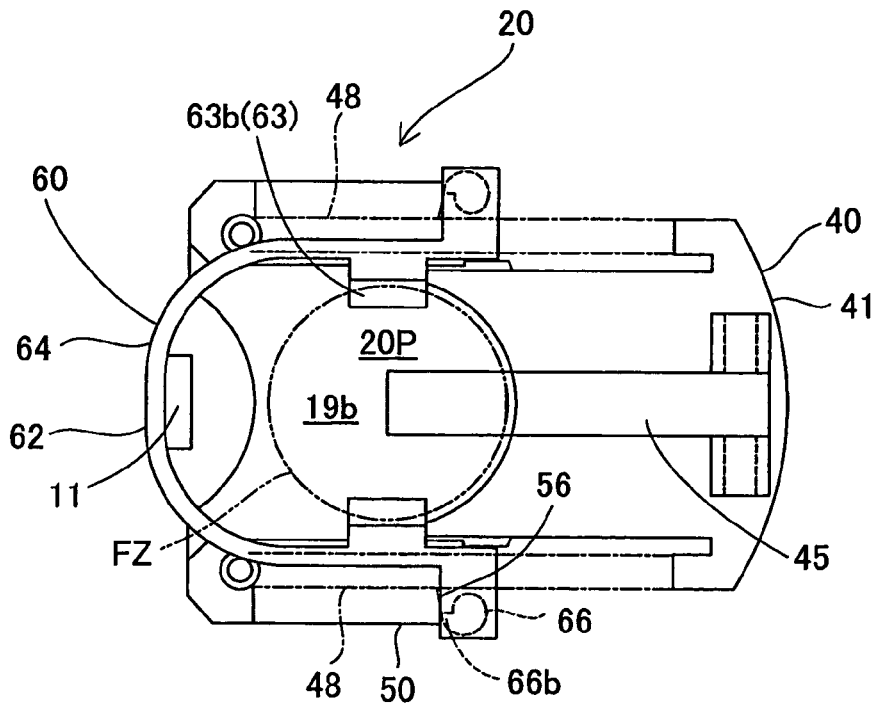
FIG. 11 shows the operation subsequent to FIG. 10.
Figure 12:
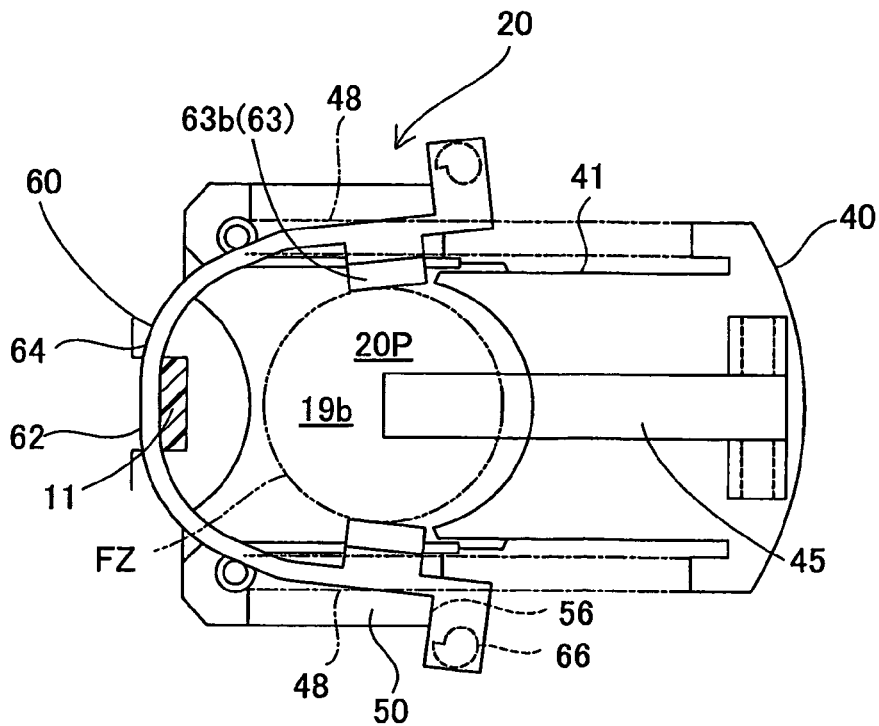
FIG. 12 shows the operation subsequent to FIG. 11.
Figure 13:
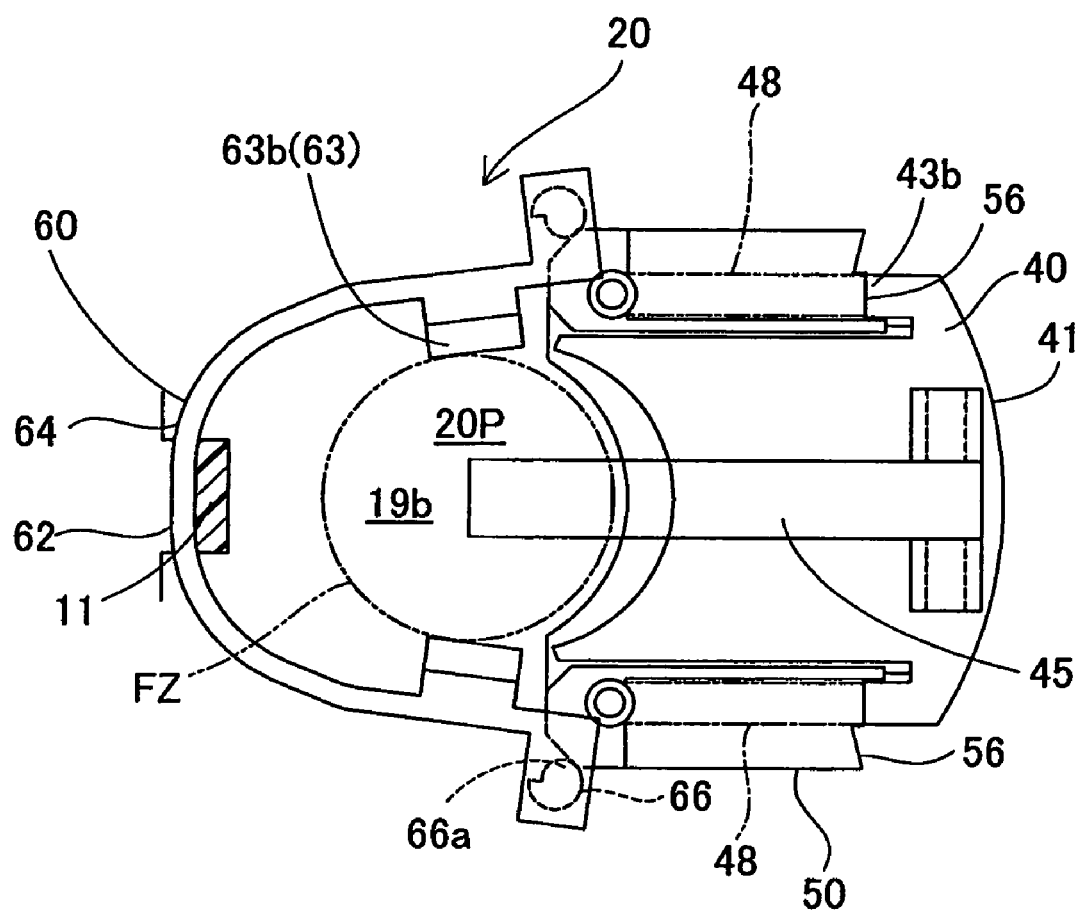
FIG. 13 shows the operation subsequent to FIG. 12.

Such opening and closing movements of the shutter mechanism 20 will be described with reference to FIGS. 10 to 13. FIGS. 10 to 13 are illustrations that depict the shutter mechanism 20 viewed from above. As shown in FIG. 10, when the fuel nozzle FZ is inserted into the insertion passage 20P of the tank neck defining member 11 and the tip of the fuel nozzle FZ begins to push against the push member 31 of the push mechanism 30 (FIG. 7), the interconnection member 41 of the interconnection mechanism 40 will undergo displacement in the horizontal direction through the agency of the link member 45, as depicted in FIG. 11. This displacement of the interconnection member 41 in the horizontal direction will cause the springs 48 to extend, and the resultant force will be accumulated as mechanical energy. Then, as depicted in FIG. 12, the fuel nozzle FZ will reach the introduction pressure members 63 of the nozzle sensing mechanism 60 and push against the sloping push faces 63b of the introduction pressure members 63. When the sloping push faces 63b receive force directed in the diametrical direction from the fuel nozzle FZ, the connecting arm 64 will deflect so as to accumulate spring force while the nozzle sensing member 62 undergoes outward expansion centered on the center part of the connecting arm 64. As the nozzle sensing member 62 experiences outward expansion, the lock portions 66 will disengage from the locking portions 56 of the shutter 50 and switch to the unlocked position. The mechanical energy that has been accumulated by the springs 48 will be released thereby; specifically, the springs 48 will pull open the shutter 50 as depicted in FIG. 13. The shutter 50 will open up access to the insertion aperture 19b so that fueling can be carried out from the fuel nozzle.

As the fuel nozzle FZ is pushed in further, the opening/closing member 71 of the flap valve mechanism 70 depicted in FIG. 3 will be pushed along in opposition to the urging force of the spring 72, whereupon the opening/closing member 71 will rotate about the support shaft, opening up access to the filler inlet 18a. When the fuel nozzle is then inserted into the filler inlet 18a, fuel will be supplied to the fuel passage 11P. In this way, once the fuel nozzle FZ pushes against the push member 31 of the shutter mechanism 20, then further pushes against the introduction pressure members 63 of the nozzle sensing mechanism 60 and then pushes against the opening/closing member 71 of the flap valve mechanism 70, the opening/closing member 71 will open up access to the filler inlet 18a to allow fueling.

(3)-2 Closing Movement

When fueling is completed and the fuel nozzle FZ is withdrawn from the filler inlet 18a, the opening/closing member 71 of the flap valve mechanism 70 will close access to the filler inlet 18a due to the recovery force of the spring 72, and as the fuel nozzle FZ is withdrawn further, the system will return from the state shown in FIG. 9 back through that in FIG. 8 to the initial state shown in FIG. 7; specifically, the push member 31 will rotate about the rotational support part 33 in response to the spring force of the spring 36, causing the interconnection member 41 to undergo displacement toward the closed direction through the agency of the link member 45. At this time, the pushing edges 43b of the interconnection member 41 shown in FIG. 5 will push against the push edges 55 of the shutter 50, maintaining the springs 48 in the contracted state and bringing about displacement of the shutter 50 toward the closed direction in unison with the interconnection member 41 so that the insertion aperture 19b is closed off. When the locking portions 56 then reach the lock portions 66, the nozzle sensing member 62 will contract in diameter by virtue of its elastic force, and the locking portions 56 will engage the lock portions 66. The shutter mechanism 20 will then return to its initial state, and the fuel cover (FIG. 1) will close.

(4) Working Effects of Fuel Tank Closure System

The fuel tank opening-closing device 10 according to the embodiment set forth above affords the following working effects.

(4)-1 The interconnection mechanism 40 accumulates, in the form of mechanical energy, the force of displacement produced when the push member 31 of the push mechanism 30 is pushed by the tip of the fuel nozzle FZ; and when the tip of the fuel nozzle FZ pushes against the introduction pressure members 63 of the nozzle sensing mechanism 60, this stored mechanical energy is utilized for the opening movement of the shutter 50. With this design, the push mechanism 30 is not limited to the location of the nozzle sensing mechanism 60, and can be situated a considerable distance toward the insertion side beyond the nozzle sensing mechanism 60 so that a large amount of mechanical energy that has been accumulated utilizing the considerable displacement of the push member 31 will be available for opening the shutter 50. Thus, opening and closing movements can take place more reliably, even if increased frictional force is encountered due to freezing up of the shutter 50 or the like.

(4)-2 The push mechanism 30 and the nozzle sensing mechanism 60 are constituted as separate mechanisms situated apart from one another within the insertion passage 20P; specifically, the push mechanism 30 is situated at the wide-mouthed access inlet 16c of the insertion passage 20P at the insertion aperture end thereof, while the nozzle sensing mechanism 60 is situated close to the shutter 50. Consequently, the fuel nozzle FZ can be inserted into the insertion passage 20P having this sort of large access inlet 16c, thus affording improved ease of fueling operations.

(4)-3 Even when the push member 31 of the push mechanism 30 is pushed against by the fuel nozzle FZ, the shutter 50 will not open until the introduction pressure members 63 of the nozzle sensing mechanism 60 are pushed by the fuel nozzle FZ, and thus even if fuel should be inadvertently discharged from the fuel nozzle FZ, the fuel will be blocked and will not be delivered to the fuel tank.

(4)-4 When the fuel nozzle FZ is inserted for the purpose of fueling, the shutter 50 of the shutter mechanism 20 will open, and the opening/closing member 71 of the flap valve mechanism 70 will open up access to the filler inlet 18a; thus, in contrast to a fuel cap detached by unscrewing, the inconvenience of having to find a place to put the detached fuel cap during fueling is avoided, thus affording better ease of operation.

(4)-5 As shown in FIG. 6, the nozzle sensing mechanism 60 is provided with introduction pressure members 63 that are situated so as to be pushed against by the fuel nozzle FZ if its outside diameter is equal to or greater than a prescribed diameter; thus, in the case of the diesel fuel nozzle FZ(a) the shutter 50 will open up access to the insertion aperture 19b, whereas in the case of the gasoline fuel nozzle FZ(b) the shutter 50 will not open up access to the insertion aperture 19b. Consequently, where the type of fuel differs in association with the outside diameter of the fuel nozzle FZ, since the shutter 50 will not open if the wrong fuel nozzle FZ is inserted, it will not be possible to pump the wrong type of fuel.

(4)-6 Since the shutter 50 is situated to the front of the flap valve mechanism 70, watertight functionality is sufficient to withstand even high-pressure washing of the vehicle.

(4)-7 Since the nozzle sensing mechanism 60 is constituted separately from the push mechanism 30, the system can be adapted to fuel nozzles FZ of different outside diameters simply by swapping out the component.

(4)-8 Since the shutter mechanism 20 has been designed so that the shutter 50 opens when the introduction pressure members 63 of the nozzle sensing mechanism 60 are pushed by the fuel nozzle FZ subsequent to the push member 31 of the push mechanism 30 having been pushed, no driving mechanism, such as a switch or motor, need be provided for the opening or closing movement, thus affording a simple design.

(4)-9 Even if a gasoline fuel nozzle is inadvertently inserted into the insertion passage 20P, it will be blocked by the shutter mechanism 20 and will not come into direct contact with the flap valve mechanism 70, thus avoiding damage to the flap valve mechanism 70, as well as eliminating the need for the flap valve mechanism 70 per se to be made stronger in consideration of the possibility of such an event.

(4)-10 As shown in FIG. 5, the lock portions 66 of the nozzle sensing member 62 are provided with a lock claw 66b that projects out from the outside peripheral part of the lock portion body 66a, whereby during transitioning of the nozzle sensing member 62 from the closed state to the opening movement (transitioning from FIG. 11 to FIG. 12), the lock portions 66 will be in abutment against the locking portions 56, increasing the slide resistance vis-à-vis the locking portions 56 and limiting outward expansion of the nozzle sensing member 62, thus assuring proper sensing operation by the introduction pressure members 63 of the nozzle sensing member 62. Meanwhile, Since the lock portion body 66a has a round tubular face, during closing of the shutter, the lock portions 66 exhibit low frictional resistance vis-à-vis the side faces of the shutter 50 so that the return movement of the to shutter will take place smoothly (see FIG. 13).

(5) Additional Embodiments

This invention should not be construed as limited to the embodiment set forth herein, and may be reduced to practice in various modes without departing from the spirit of the invention. Whereas the embodiment herein teaches the use of a spring as the accumulation member of the interconnection mechanism 40, no particular limitation is imposed thereby, and air cylinders or the like could be used instead.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A fuel tank opening-closing device adapted to open and close a passage for supplying fuel to a fuel tank, the device comprising:
   a tank neck defining member defining a passage that includes (i) an insertion passage for insertion of a fuel nozzle and (ii) an insertion aperture to connect the insertion passage with the fuel tank; and
   a shutter mechanism situated inside the tank neck defining member, and having a shutter adapted to open and close the insertion aperture through displacement in a direction substantially perpendicular to an insertion direction in which the fuel nozzle is inserted;
   wherein the shutter mechanism includes:
   a push mechanism situated in the insertion passage and having a push member adapted to undergo displacement upon receiving insertion force of the fuel nozzle;
   an interconnection mechanism adapted to accumulate force of the displacement of the push member as mechanical energy, and to open the shutter using the accumulated mechanical energy; and
   a nozzle sensing mechanism situated between the push member and the shutter, and having (i) an introduction pressure member adapted to receive the insertion force by the fuel nozzle; and (ii) a lock portion formed to be switchable between a locked position locking the shutter in a closing position and an unlocked position allowing the shutter to move to an opening position;
   wherein the shutter mechanism is configured to open the shutter by the mechanical energy accumulated in the interconnection mechanism, when the lock portion of the nozzle sensing mechanism shifts from the locked position to the unlocked position.

2. The fuel tank opening-closing device in accordance with claim 1 wherein
   the push mechanism has a push member body of plate shape adapted to be pushed by the fuel nozzle; and a rotational support part provided at an edge of the push member body and adapted to rotatably support the push member body.

3. The fuel tank opening-closing device in accordance with claim 2 wherein
the push mechanism includes a spring adapted to urge the push member body in opposition to the insertion force of the fuel nozzle.

4. The fuel tank opening-closing device in accordance with claim 3 wherein
the interconnection mechanism includes an interconnection member that is mechanically interlinked with the push member and that is displaced and communicated with the push member; and an accumulation member adapted to accumulate the mechanical energy produced by displacement of the interconnection member.

5. The fuel tank opening-closing device in accordance with claim 4 wherein
the interconnection member has an actuation member body installed slidably on the shutter; and
the accumulation member is an elastic member suspended between the actuation member body and the shutter.

6. The fuel tank opening-closing device in accordance with claim 5 wherein
the elastic members are springs.

7. The fuel tank opening-closing device in accordance with claim 6 wherein
the nozzle sensing mechanism includes a nozzle sensing member formed in a U-shape and supported by the neck defining member, and situated above the interconnection member, wherein
the nozzle sensing member includes (i) the introduction pressure member on an inside peripheral part of the nozzle sensing member; and the lock portion at an end of the nozzle sensing member.

8. The fuel tank opening-closing device in accordance with claim 7, further comprising:
a filler inlet defining member having a filler inlet that is situated facing the insertion aperture; and
a flap valve mechanism situated toward the fuel tank side with respect to the shutter, and adapted to be pushed by the fuel nozzle and thereby open the filler inlet.

9. The fuel tank opening-closing device in accordance with claim 5 wherein
the lock portions includes a lock portion body engaging with a locking portion formed on an end of the shutter, and a lock claw projecting on a circumference of the locking portion toward the locking portion.

10. The fuel tank opening-closing device in accordance with claim 1 wherein
the interconnection mechanism includes an interconnection member that is mechanically interlinked with the push member and that is displaced and communicated with the push member; and an accumulation member adapted to accumulate the mechanical energy produced by displacement of the interconnection member.

11. The fuel tank opening-closing device in accordance with claim 10 wherein
the interconnection member has an actuation member body installed slidably on the shutter; and
the accumulation member is an elastic member suspended between the actuation member body and the shutter.

12. The fuel tank opening-closing device in accordance with claim 11 wherein
the elastic members are springs.

13. The fuel tank opening-closing device in accordance with claim 12 wherein
the nozzle sensing mechanism includes a nozzle sensing member formed in a U-shape and supported by the neck defining member, and situated above the interconnection member, wherein
the nozzle sensing member includes (i) the introduction pressure member on an inside peripheral part of the nozzle sensing member; and the lock portion at an end of the nozzle sensing member.

14. The fuel tank opening-closing device in accordance with claim 13, further comprising:
a filler inlet defining member having a filler inlet that is situated facing the insertion aperture; and
a flap valve mechanism situated toward the fuel tank side with respect to the shutter, and adapted to be pushed by the fuel nozzle and thereby open the filler inlet.

15. The fuel tank opening-closing device in accordance with claim 11 wherein
the lock portions includes a lock portion body engaging with a locking portion formed on an end of the shutter, and a lock claw projecting on a circumference of the locking portion toward the locking portion.

16. The fuel tank opening-closing device in accordance with claim 1, further comprising:
a filler inlet defining member having a filler inlet that is situated facing the insertion aperture; and
a flap valve mechanism situated toward the fuel tank side with respect to the shutter, and adapted to be pushed by the fuel nozzle and thereby open the filler inlet.

* * * * *